United States Patent
Huh et al.

(10) Patent No.: US 7,807,237 B2
(45) Date of Patent: Oct. 5, 2010

(54) LIQUID CRYSTAL COMPOSITION AND LIQUID CRYSTAL DISPLAY USING THE SAME

(75) Inventors: Su-Jung Huh, Yongin-si (KR); Nam-Seok Lee, Suwon-si (KR); Jeong-Uk Heo, Seongnam-si (KR); Duck-Jong Suh, Seoul (KR); So-Youn Park, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 167 days.

(21) Appl. No.: 12/104,796

(22) Filed: Apr. 17, 2008

(65) Prior Publication Data

US 2008/0304002 A1    Dec. 11, 2008

(30) Foreign Application Priority Data

Apr. 19, 2007 (KR) ............. 10-2007-0038416
Apr. 15, 2008 (KR) ............. 10-2008-0034767

(51) Int. Cl.
*C09K 19/34* (2006.01)
*C09K 19/30* (2006.01)
*C09K 19/12* (2006.01)

(52) U.S. Cl. ............. 428/1.1; 252/299.61; 252/299.63; 252/299.66

(58) Field of Classification Search ............. 428/1.1; 252/299.61, 299.63, 299.66, 299.67
See application file for complete search history.

(56) References Cited

U.S. PATENT DOCUMENTS

| 6,596,349 B2 | 7/2003 | Kondou et al. | |
| 2006/0050035 A1* | 3/2006 | Leo et al. | 345/89 |
| 2007/0001149 A1* | 1/2007 | Manabe et al. | 252/299.66 |

FOREIGN PATENT DOCUMENTS

| KR | 1020000050389 | 8/2000 |
| KR | 1020060082918 | 7/2006 |

OTHER PUBLICATIONS

English abstract for KR-2001108824 provided by Derwent Acc-No. 2002-359168.*

* cited by examiner

*Primary Examiner*—Shean C Wu
(74) *Attorney, Agent, or Firm*—H.C. Park & Associates, PLC (57) ABSTRACT

Disclosed are a liquid crystal composition and a liquid crystal display using the same. The liquid crystal composition includes a polar compound and a low-viscosity compound. The liquid crystal display includes first and second substrates that face each other, and first and second electrodes disposed on the first and second substrates, respectively. A liquid crystal layer including the liquid crystal composition is disposed between the first and second substrates.

18 Claims, 3 Drawing Sheets

LIQUID CRYSTAL COMPOSITION AND LIQUID CRYSTAL DISPLAY USING THE SAME

CROSS-REFERENCE TO RELATED APPLICATION

This application claims priority from and the benefit of Korean Patent Application Nos. 10-2007-0038416 and 10-2008-0034767 filed on Apr. 19, 2007, and Apr. 15, 2008, respectively, which are hereby incorporated by reference for all purposes as if fully set forth herein.

BACKGROUND OF THE INVENTION

1. Field of the Invention

The present invention relates to a liquid crystal composition and a liquid crystal display using the same. More particularly, the present invention relates to a liquid crystal composition that may improve an operational speed of a liquid crystal display and a liquid crystal display using the same.

2. Discussion of the Background

A liquid crystal display is an apparatus that displays an image using liquid crystals. The liquid crystal display includes two opposite substrates and a liquid crystal layer disposed between the two opposite substrates. Electrodes are provided on the two opposite substrates, respectively, and the liquid crystal layer includes liquid crystals including various compounds. An electric field is generated between the electrodes and applied to the liquid crystal layer, and the alignment of the liquid crystals changes according to the electric field. The transmittance of light that is output after passing through the liquid crystal layer changes according to the alignment of the liquid crystals, so that an image having a corresponding gray scale is displayed.

In such a liquid crystal display, the operational speed may be improved as the alignment of liquid crystals rapidly changes in response to the electric field. A method of increasing the intensity of the electric field applied to the liquid crystal layer has been suggested to rapidly change the alignment of liquid crystals. However, since a small-sized display apparatus, such as a portable phone or a notebook computer, is driven with low-voltage, the amount by which the intensity of the electric field may be increased is limited. As a result, the operational speed of the liquid crystal display may be decreased.

SUMMARY OF THE INVENTION

The present invention provides a liquid crystal composition that may improve the operational speed of a liquid crystal display.

The present invention also provides a liquid crystal display including the liquid crystal composition.

Additional features of the invention will be set forth in the description which follows, and in part will be apparent from the description, or may be learned by practice of the invention.

The present invention discloses a liquid crystal composition including a first compound according chemical formula 1 and a second compound according to chemical formula 2.

<chemical formula 1>
<chemical formula 2>

$R_1$, $R_2$, and $R_3$ each denote an alkyl group, an alkenyl group or an alkoxy group.

The present invention also discloses a liquid crystal display including a first substrate, a second substrate, a first electrode disposed on the first substrate, a second electrode disposed on the second substrate and facing the first electrode, and a liquid crystal layer disposed between the first and second substrates. The liquid crystal layer includes first and second compounds according to chemical formulas 1 and 2, respectively.

<chemical formula 1>
<chemical formula 2>

$R_1$, $R_2$, and $R_3$ each denote an alkyl group, an alkenyl group or an alkoxy group.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present.

Figure 1A:
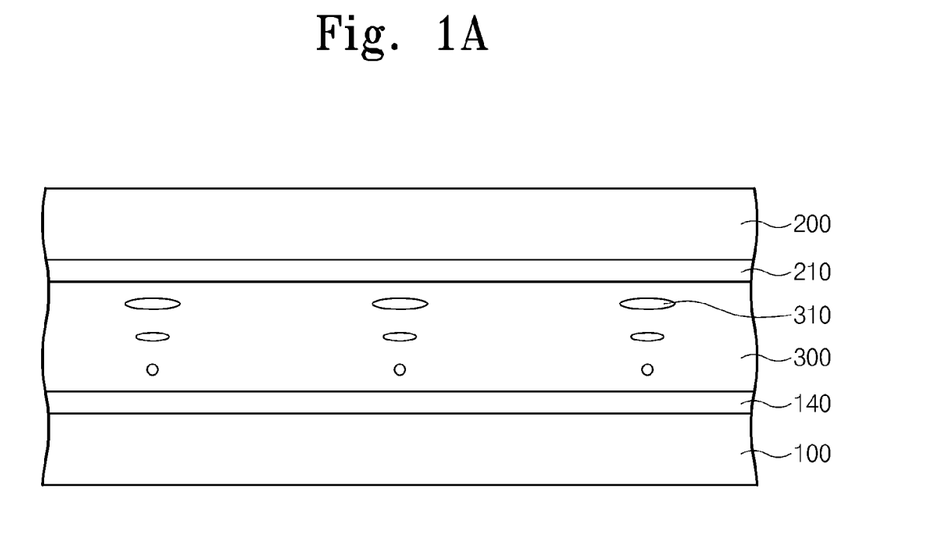
FIG. 1A and FIG. 1B are sectional views showing the operational procedure of a liquid crystal display according to an exemplary embodiment of the present invention.
Figure 1B:
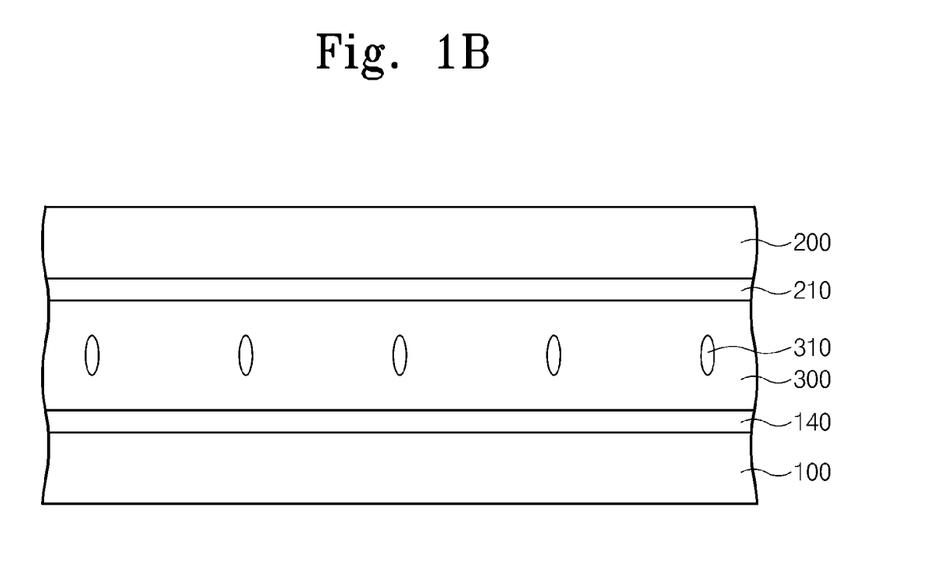

FIG. 1A and FIG. 1B are sectional views showing the operational procedure of a liquid crystal display according to an exemplary embodiment of the present invention.

Referring to FIG. 1A and FIG. 1B, the liquid crystal display includes first and second substrates 100 and 200 that are opposite to each other. A pixel electrode 140 is disposed on the first substrate 100 and a common electrode 210 is disposed on the second substrate 200. A liquid crystal layer 300, which includes liquid crystals 310, is disposed between the first and second substrates 100 and 200.

When the liquid crystal display operates, a data voltage is applied to the pixel electrode 140 and a common voltage is applied to the common electrode 210. The data voltage varies corresponding to an image to be displayed, and the common voltage has a constant value. An electric field is applied to the liquid crystal layer 300 due to the potential difference between the data voltage and the common voltage. The liquid crystals 310 have dielectric anisotropy and the alignment directions of the liquid crystals 310 change according to the electric field. Each liquid crystal 310 has a long axis and a short axis, and the alignment direction of a liquid crystal 310 is defined as the direction of the long axis. If the liquid crystals 310 have positive dielectric anisotropy, the liquid crystals 310 are aligned parallel to the electric field. If the liquid crystals 310 have negative dielectric anisotropy, the liquid crystals 310 are aligned vertically to the electric field. In the present exemplary embodiment, the liquid crystals 310 have positive dielectric anisotropy.

As shown in FIG. 1A, if an electric field is not applied to the liquid crystals 310, the liquid crystals 310 are aligned parallel to the first and second substrates 100 and 200. In addition, the liquid crystals 310 adjacent to the pixel electrode 140 are aligned in a first direction, and the liquid crystals 310 adjacent to the common electrode 210 are aligned in a second direction, which is perpendicular to the first direction. In addition, the liquid crystals 310 disposed between the pixel electrode 140 and the common electrode 210 have a twist configuration, in which the alignment directions of the liquid crystals 310 gradually changes from the first direction to the second direction.

Polarizing plates (not shown) having transmission axes perpendicular to each other are attached to outer portions of the first and second substrates 100 and 200. If light is supplied to the polarizing plate attached to the outer portion of the first substrate 100, the light is linearly polarized. The linearly polarized light is phase-shifted by an angle of 90° while passing through the liquid crystals 310 aligned in the twist configuration. The phase-shifted light passes through the polarizing plate attached to the second substrate 200, so that the liquid crystal display achieves its brightest state.

As shown in FIG. 1B, if an electric field is applied to the liquid crystal layer 300, the liquid crystals 310 are aligned vertically to the first and second substrates 100 and 200. In this case, the phase of light passing through the liquid crystals 310 may not change. Therefore, the light, which is linearly polarized through the polarizing plate attached to the outer portion of the first substrate 100, is absorbed by the polarizing plate attached to the outer portion of the second substrate 200, so that the liquid crystal display achieves its darkest state.

The liquid crystals 310 are vertically aligned when the electric field has its maximum intensity. In addition, the liquid crystals 310 may be tilted with respect to the first and second substrates 100 and 200 by adjusting the intensity of the electric field. In this case, the phase of light, which is linearly polarized through the polarizing plate attached to the outer portion of the first substrate 100, is partially changed, so that part of the light may pass through the polarizing plate attached to the outer portion of the second substrate 200. As a result, the liquid crystal display achieves an intermediate brightness state.

Figure 2:
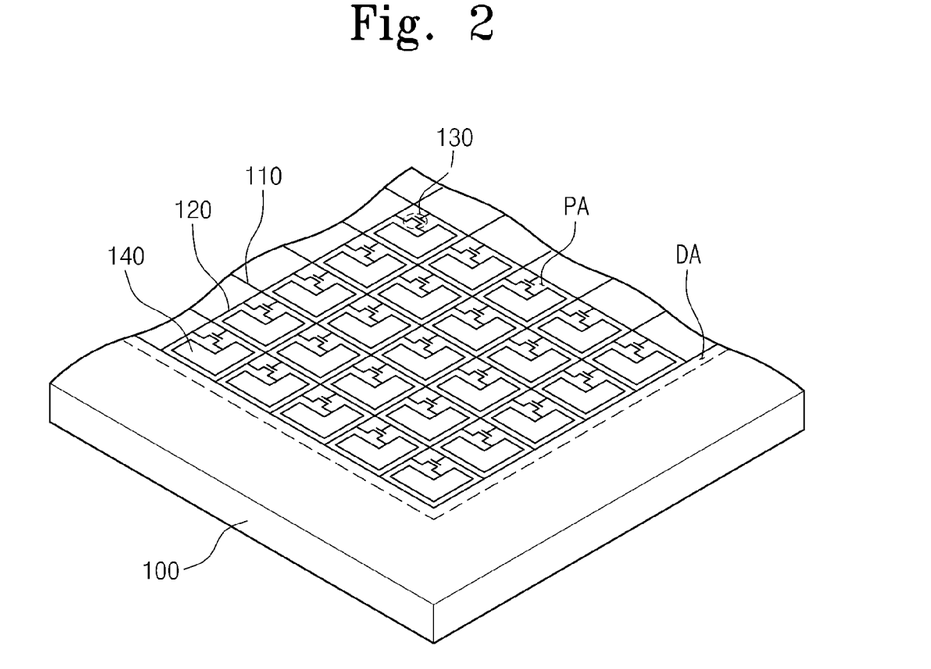
FIG. 2 is an enlarged perspective view of a first substrate provided in a liquid crystal display shown in FIG. 1A.

FIG. 2 is an enlarged perspective view of the first substrate 100 provided in the liquid crystal display shown in FIG. 1A.

Referring to FIG. 2, a display area DA is defined on the first substrate 100 to display an image. The display area DA includes a central portion of the first substrate 100. A plurality of signal lines is disposed in the display area DA of the first substrate 100. A plurality of pixel areas PA is defined by the signal lines. Each pixel area PA has the same structure.

The signal lines include gate lines 110 and data lines 120. The gate lines 110 cross the data lines 120, thereby defining the pixel areas PA. Each pixel area PA includes a thin film transistor 130 and a pixel electrode 140. The thin film transistor 130 includes a control electrode connected to the gate line 110, an input electrode connected to the data line 120, and an output electrode connected to the pixel electrode 140. A gate signal is transferred to the gate line 110, and the thin film transistor 130 is turned on by the gate signal. In addition, a data signal is transferred to the data line 120 and a data voltage corresponding to the data signal is applied to the pixel electrode 140. The liquid crystals 310 are vertically aligned or tilted with respect to the first and second substrates 100 and 200 according to the data voltage, so that an image corresponding to the alignment state of the liquid crystals 310 is displayed.

In such a display device, a response time is defined as a sum of first and second times, in which the first time is the time required to change from the brightest state to the darkest state and the second time is the time required to change from the darkest state to the brightest state. As the response time is reduced, the operational speed of the liquid crystal display may be improved. According to the present exemplary embodiment, the composition of compounds forming the liquid crystals 310 is controlled such that the physical properties of the composition may be optimized, and the composition of the liquid crystals is operated under the proper operational condition, which may improve the operational speed of the liquid crystal display. The physical properties of the composition are mainly related to rotational viscosity and the operation condition is mainly related to a cell gap and driving voltage. The cell gap refers to a distance between the pixel electrode 140 and the common electrode 210 and corresponds to the thickness of the liquid crystal layer 300. The driving voltage corresponds to the voltage difference between the pixel electrode 140, which serves to apply the electric field to the liquid crystal layer 300, and the common electrode 210. In detail, the driving voltage has a value, which substantially corresponds to a double of the voltage difference between the pixel electrode 140 and the common electrode 210 in the darkest state of the liquid crystal display at which the electric field is maximized.

Figure 3:
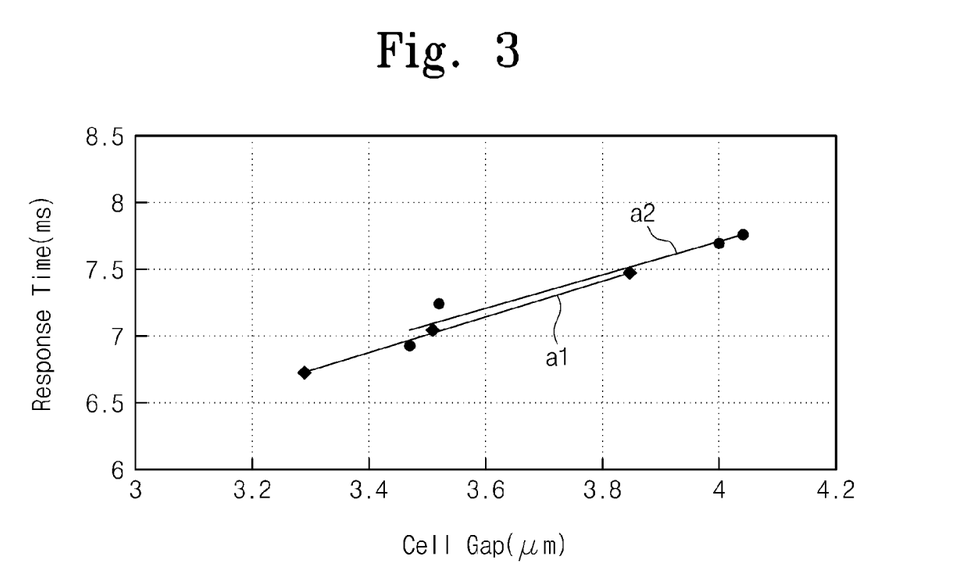
FIG. 3 is a graph showing variation of a response time as a function of a cell gap in a liquid crystal display shown in FIG. 1A.

FIG. 3 is a graph showing variation of the response time as a function of the cell gap in the liquid crystal display shown in FIG. 1A. That is, FIG. 3 shows the response time according to the cell gap when liquid crystal composition samples a1 and a2 have different physical properties. The first liquid crystal composition sample a1 has a rotational viscosity of 66 mPa·s, a dielectric anisotropy of 9.0, and a refractive-index anisotropy of 0.112. The second liquid crystal composition sample a2 has a rotational viscosity of 61 mPa·s, a dielectric anisotropy of 9.0, and a refractive-index anisotropy of 0.104. Points shown in the graph of FIG. 3 represent the actual measurement result and the straight line connecting the points represents the interpolation result calculated based on the actual measurement result.

Referring to FIG. 3, as the cell gap increases in the liquid crystal display, the response time is increased. The response time of the first and second samples a1 and a2 linearly changes according to the cell gap. The above result exhibits that the cell gap must be reduced to improve the operational speed of the liquid crystal display.

Although not shown in FIG. 3, in the case of liquid crystal compositions having physical properties different from those of the first and second samples a1 and a2, that is, in the case of liquid crystal compositions having a rotational viscosity outside the range of 61 mPa·s to 66 mPa·s, the response time may not change linearly according to the cell gap. Thus, in the case of liquid crystal compounds having a rotational viscosity outside the range of 61 mPa·s to 66 mPa·s, the proper cell gap range may not be easily established and the operational characteristics of the liquid crystal display may not be easily controlled.

Figure 4:
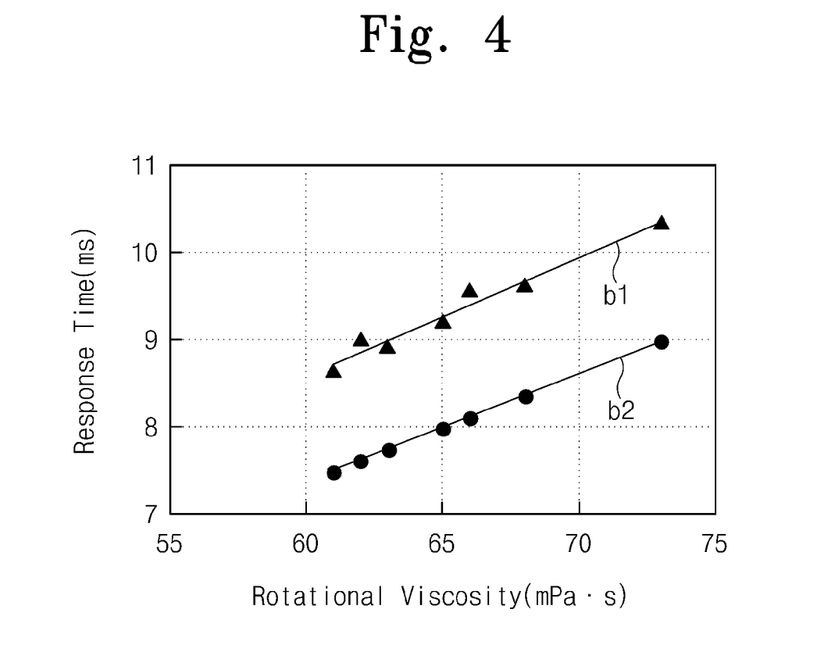
FIG. 4 is a graph showing variation of a response time as a function of rotational viscosity when a liquid crystal display shown in FIG. 1A is subject to different driving voltages.

FIG. 4 is a graph showing a variation in the response time as a function of rotational viscosity when the liquid crystal display shown in FIG. 1A is subject to different driving voltages. The cell gap was fixed to 3.5 μm, and the response time of liquid crystal display samples b1 and b2, which are driven with different driving voltages, was measured in relation to liquid crystal compounds have various rotational viscosities. The first liquid crystal display sample b1 was driven with a driving voltage of 7.8 V, and the second liquid crystal display sample b2 was driven with a driving voltage of 8.5 V. Points shown in the graph of FIG. 4 represent the actual measurement result and the straight line connecting the points represents the interpolation result calculated based on the actual measurement result.

Referring to FIG. 4, the response time increases proportionally to the rotational viscosity in the liquid crystal display. The response time of the first and second samples changes linearly according to the rotational viscosity. In addition, if the liquid crystals have the same rotational viscosity, the response time increases proportionally to the driving voltage. The liquid crystal display represents a remarkable operational speed when the response time is about 9 ms. As shown in FIG. 4, if the driving voltage of the liquid crystal display is 8.5 V and the rotational viscosity of the liquid crystal composition is in the range of 61 mPa·s to 65 mPa·s, the liquid crystal display has a response speed of 8 ms or less.

Figure 5:
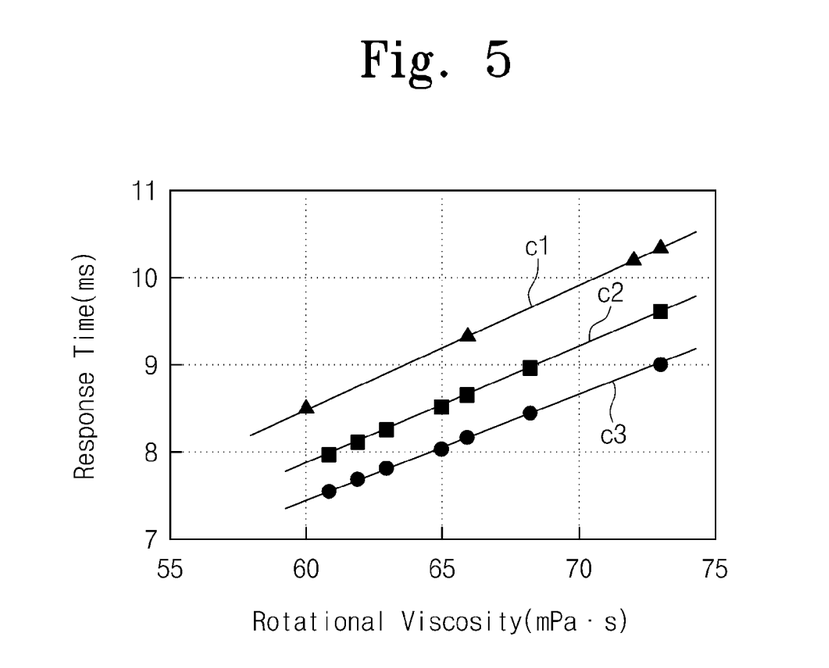
FIG. 5 is a graph showing a variation in response time as a function of rotational viscosity at different cell gaps in a liquid crystal display shown in FIG. 1A.

FIG. 5 is a graph showing variation of the response time as a function of rotational viscosity at different cell gaps in the liquid crystal display shown in FIG. 1A. The driving voltage was fixed to 8.5 V, and the response time of liquid crystal display samples c1, c2, and c3, which have different cell gaps, was measured in relation to liquid crystal compositions having various rotational viscosities. The first liquid crystal display sample c1 has a cell gap of 3.75 μm, the second liquid crystal display sample c2 has a cell gap of 3.6 μm, and the third liquid crystal display sample c3 has a cell gap of 3.5 μm. Points shown in the graph of FIG. 5 represent the actual measurement result and the straight line connecting the points represents the interpolation result calculated based on the actual measurement result.

Referring to FIG. 5, the response time increases proportionally to the rotational viscosity in the liquid crystal display. The response time of the first, second, and third samples c1, c2, and c3 changes linearly according to the rotational viscosity. In addition, if the liquid crystal has the same rotational viscosity, the response time increases proportionally to the cell gap. A liquid crystal display has remarkable operational speed when the response time is about 8 ms. As shown in FIG. 5, if the rotational viscosity of the liquid crystal composition is in the range of 61 mPa·s to 65 mPa·s under the cell gap range (3.5 μm to 3.75 μm) of the above samples c1, c2, and c3, the liquid crystal display has a response speed of about 8 ms. The cell gap range (3.5 μm to 3.75 μm) may be slightly changed according to the rotational viscosity of the liquid crystal composition. For instance, if the rotational viscosity approximates to 61 mPa·s, there is no problem even if the cell gap exceeds 3.75 μm. When the cell gap is about 4 μm, a remarkable response time is realized. In addition, if the rotational viscosity approximates 65 mPa·s, the cell gap may be less than 3.5 μm. For example, the cell gap is about 3.4 μm.

From the above measurement results, the liquid crystal composition and the operational condition of the liquid crystal display have been presented. That is, the liquid crystal composition may have a rotational viscosity of 65 mPa·s or less, the driving voltage of the liquid crystal display may be about 8.5 V, and the cell gap may be about 3.6 μm. The physical properties, such as the rotational viscosity, other than the driving voltage and the cell gap, may be adjusted by controlling components of the liquid crystal composition.

Table 1 shows liquid crystal composition samples including various components.

TABLE 1

| Class | | S1 | S2 | S3 | S4 |
|---|---|---|---|---|---|
| Polar Group | (I) R–[phenyl]–[phenyl(F)]–[phenyl(F,F,F)]–F | 13 | 0 | 15 | 15 |
| | (II) R–[phenyl]–[phenyl(F)]–[phenyl(F)]–R' | 6 | 7 | 0 | 6 |
| | (III) R–[phenyl]–[phenyl(F,F)]–CF$_2$O–[phenyl(F,F)]–F | 15 | 15 | 9 | 0 |
| Neutral Group | (IV) R–[cyclohexyl]–[cyclohexyl]–R | 23 | 27 | 32 | 34 |
| | (V) R–[cyclohexyl]–[phenyl]–R | 10 | 12 | 10 | 11 |
| | (VI) R–[cyclohexyl]–[cyclohexyl]–[phenyl]–R' | 13 | 10.5 | 17 | 3 |
| Voltage Holding Ratio | | 95.11% | 97.81% | 96.32% | 95.75% |

Referring to Table 1, liquid crystal composition samples S1, S2, S3, and S4 include compounds that belong to a polar group and a neutral group. The compounds belonging to the polar group include terphenyl-based compounds (I and II) and compounds containing CF$_2$O (III). The compounds belonging to the neutral group include low-viscosity compound (IV), 2-ring alkenyl compound (V), and 3-ring alkenyl compound (VI). In the chemical formulas shown in Table 2, R and R' denote alkyl groups (C$_n$H$_{2n+1}$; n is a natural number) or alkenyl groups (C$_n$H$_{2n}$; n is a natural number). In some cases, R and R' denote alkoxy groups in which oxygen is contained in a carbon chain.

The compounds belonging to the polar group allow the liquid crystal composition to have polarity such that the liquid crystals may rapidly respond to the electric field applied to the liquid crystal layer. The intensity of polarity of the liquid crystal composition may vary depending on the component and component ratio of compounds belonging to the polar group. The compounds belonging to the neutral group determine other physical properties of the liquid crystal composition in cooperation with the compounds belonging to the polar group. For instance, if the amount of the compounds belonging to the polar group increases, the intensity of the polarity of the liquid crystal composition may increase, so that the rotational viscosity of the liquid crystal composition may also increase. Among the compounds belonging to the neutral group, the low-viscosity compound (IV) may prevent the viscosity of the liquid crystal composition from being excessively increased.

The liquid crystal composition of the first sample S1 includes six types of compounds. In the liquid crystal compositions of the second, third, and fourth samples S2, S3, and S4, one of three compounds belonging to the polar group is removed. That is, the liquid crystal compositions of the second and third samples S2 and S3 do not include terphenyl-based compounds (I and II), and the liquid crystal composition of the fourth sample S4 does not include compound containing CF$_2$O (III).

As shown in Table 1, the second and third samples S2 and S3 provide superior voltage holding ratios in the liquid crystal display. The voltage holding ratio represents the holding capability for voltage applied to the pixel electrode and the common electrode. Besides the voltage holding ratio, a line-afterimage and a surface-afterimage were tested in the liquid crystal display using the samples. The second and third samples S2 and S3 exhibited superior performance in the afterimage test.

Table 2 shows the components and weight ratios of the liquid crystal composition according to an exemplary embodiment of the present invention.

TABLE 2

| Class | | Weight Ratio |
|---|---|---|
| Neutral Group |  | 40 |
| |  | 13 |
| |  | 6.5 |
| Polar Group |  | 5.5 |
| |  | 14 |
| |  | 15 |
| |  | 6.0 |

Table 3 shows the components and weight ratios of the liquid crystal composition according to another exemplary embodiment of the present invention.

TABLE 3

| Class | | Weight Ratio |
|---|---|---|
| Neutral Group |  | 43 |
| |  | 14 |
| |  | 5 |
| |  | 2 |
| Polar Group |  | 15 |
| |  | 8 |
| |  | 13 |

Tables 2 and 3 are prepared based on the result shown in FIG. 3, FIG. 4, and FIG. 5 and Table 1.

Referring to Tables 2 and 3, the liquid crystal composition includes a first compound, which belongs to the polar group, according to chemical formula 1.

<chemical formula 1>

In chemical formula 1, $R_1$ denotes an alkyl group, an alkenyl group, or an alkoxy group.

The first compound is a terphenyl-based compound having three benzene rings, in which fluorine is combined with a part of each benzene ring. Fluorine has the highest electro-negativity and the polarity of the first compound is increased due to the fluorine. The first compound may be present at a weight ratio of 20 wt % or less with respect to the liquid crystal composition such that the polarity of the liquid crystal composition is not excessively increased.

The liquid crystal composition includes a second compound, which belongs to the polar group, according to chemical formula 2.

<chemical formula 2>

In chemical formula 2, $R_2$ and $R_3$ each may denote an alkyl group, an alkenyl group, or an alkoxy group. For instance, $R_2$ may denote an alkyl group and $R_3$ may denote an alkenyl group.

The second compound lowers the rotational viscosity of the liquid crystal composition. The second compound may include at least one of a compound in which $R_2$ is an ethyl group, a compound in which $R_2$ is a propyl group, and a compound in which $R_2$ is a butyl group. In particular, the compound, in which $R_2$ is the ethyl group, has low viscosity, so the compound may remarkably lower the rotational viscosity. However, since the physical properties of the liquid crystal composition may change significantly due to the low viscosity, the amount of the compound should be limited. For example, the second compound may be present at a weight ratio of 30 wt % to 40 wt % with respect to the liquid crystal composition and the compound having low viscosity, which is contained in the second compound, may be present at a weight ratio of 35 wt % or less with respect to the liquid crystal composition.

In addition to the first compound, which is the terphenyl-based compound, the liquid crystal composition may further include at least one of third, fourth, fifth, and sixth compounds, which belong to the polar group, as according to chemical formulas 3, 4, 5, and 6, respectively. For instance, the liquid crystal composition may further include third, fourth, and fifth compounds, or may further include third and sixth compounds.

<chemical formula 3>

<chemical formula 4>

-continued

<chemical formula 5>

<chemical formula 6>

In chemical formulas 3, 4, 5, and 6, $R_4$, $R_5$, $R_6$, and $R_7$ each may denote an alkyl group, an alkenyl group, or an alkoxy group.

The third, fourth, fifth, and sixth compounds include fluorine having superior electro-negativity, which may improve the polarity of the liquid crystal composition.

In addition to the second compound, which is the low-viscosity compound, the liquid crystal composition may further include at least one of seventh, eighth, and ninth compounds, which belong to the neutral group and are expressed as chemical formulas 7, 8, and 9, respectively. For instance, the liquid crystal composition may further include seventh and eighth compounds, or may further include eighth and ninth compounds.

<chemical formula 7>

<chemical formula 8>

<chemical formula 9>

In chemical formulas 7, 8, and 9, $R_8$, $R_9$, $R_{10}$, $R_{11}$, $R_{12}$, and $R_{13}$ each may denote an alkyl group, an alkenyl group, or an alkoxy group.

The substituent groups $R_1$, $R_2$, $R_3$, $R_4$, $R_5$, $R_6$, $R_7$, $R_8$, $R_9$, $R_{10}$, $R_{11}$, $R_{12}$, and $R_{13}$, which are contained in the first, second, third, fourth, fifth, sixth, seventh, eighth, and ninth compounds, may have 7 or less carbons so that the molecular weight of the liquid crystal composition may not be excessively increased.

In the case of the liquid crystal composition having the components and weight ratios as shown in Table 2, the rotational viscosity is 64 mPa·s and the dielectric anisotropy is 8.0. In addition, in the case of the liquid crystal composition having the components and weight ratios as shown in Table 3, the rotational viscosity is 64 mPa·s and the dielectric anisotropy is 9.0. The weight ratio shown in Tables 2 and 3 are for illustrative purposes only, and the liquid crystal composition of the present invention is not limited thereto. That is, the components and the weight ratios may be altered, as long as the physical properties of the liquid crystal composition, such as the rotational viscosity, are within a specific range. For example, the liquid crystal composition may have a rotational viscosity of 61 mPa·s to 65 mPa·s, a dielectric anisotropy of 7 to 9, and a refractive-index anisotropy of 0.1 to 0.12.

As described above, the response time of the liquid crystal composition and the operational speed of the liquid crystal display including the liquid crystal composition may be improved.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A liquid crystal composition, comprising:
   a first compound according to chemical formula 1;
   a second compound according to chemical formula 2; and
   a sixth compound according to chemical formula 6, wherein, $R_1$, $R_2$, $R_3$, and $R_7$ each denote an alkyl group, an alkenyl group, or an alkoxy group.

2. The liquid crystal composition of claim 1, wherein the second compound comprises at least one of a compound in which $R_2$ is an ethyl group, a compound in which $R_2$ is a propyl group, and a compound in which $R_2$ is a butyl group.

3. The liquid crystal composition of claim 2, wherein the compound, in which $R_2$ is the ethyl group, is present at a weight ratio of more than 0 wt % but not more than 35 wt % with respect to the liquid crystal composition.

4. The liquid crystal composition of claim 1, further comprising at least one of:
   a third compound according to chemical formula 3;
   a fourth compound according to chemical formula 4; and
   a fifth compound according to chemical formula 5, wherein, $R_4$, $R_5$, and $R_6$ each denote an alkyl group, an alkenyl group, or an alkoxy group.

5. The liquid crystal composition of claim 4, further comprising at least one of:
   a seventh compound according to chemical formula 7;
   an eighth compound according to chemical formula 8; and
   a ninth compound according to chemical formula 9, wherein, $R_8$, $R_9$, $R_{10}$, $R_{11}$, $R_{12}$, and $R_{13}$ each denote an alkyl group, an alkenyl group, or an alkoxy group.

6. The liquid crystal composition of claim 5, wherein $R_1$, $R_2$, $R_3$, $R_4$, $R_5$, $R_6$, $R_7$, $R_8$, $R_9$, $R_{10}$, $R_{11}$, $R_{12}$, and $R_{13}$ each have 7 carbons or less.

7. The liquid crystal composition of claim 5, wherein the first compound is present at a weight ratio of more than 0 wt % but not more than 20 wt % with respect to the liquid crystal composition.

8. The liquid crystal composition of claim 7, wherein the second compound is present at a weight ratio of 30 wt % to 40 wt % with respect to the liquid crystal composition.

9. The liquid crystal composition of claim 5, wherein the first compound is present at a weight ratio of 13 wt % with respect to the liquid crystal composition, the second compound is present at a weight ratio of 43 wt % with respect to the liquid crystal composition, the third compound is present at a weight ratio of 8 wt % with respect to the liquid crystal composition, the sixth compound is present at a weight ratio of 15 wt % with respect to the liquid crystal composition, the seventh compound is present at a weight ratio of 14 wt % with respect to the liquid crystal composition, the eighth compound is present at a weight ratio of 5 wt % with respect to the liquid crystal composition, and the ninth compound is present at a weight ratio of 2 wt % with respect to the liquid crystal composition.

10. A liquid crystal display, comprising:
a first substrate;
a second substrate;
a first electrode disposed on the first substrate;
a second electrode disposed on the second substrate and facing the first electrode; and
a liquid crystal layer disposed between the first substrate and the second substrate,
wherein the liquid crystal layer comprises a liquid crystal composition comprising:
a first compound according to chemical formula 1;
a second compound according to chemical formula 2; and
a sixth compound according to chemical formula 6, wherein, $R_1$, $R_2$, $R_3$, and $R_7$ each denote an alkyl group, an alkenyl group, or an alkoxy group.

11. The liquid crystal display of claim 10, wherein the second compound comprises at least one of a compound in which $R_2$ is an ethyl group, a compound in which $R_2$ is a propyl group, and a compound in which $R_2$ is a butyl group.

12. The liquid crystal display of claim 10, wherein the liquid crystal compound further comprises at least one of:
a third compound according to chemical formula 3;
a fourth compound according to chemical formula 4;
a fifth compound according to chemical formula 5;
a seventh compound according to chemical formula 7;
an eighth compound according to chemical formula 8; and
a ninth compound according to chemical formula 9, wherein $R_4$, $R_5$, $R_6$, $R_8$, $R_9$, $R_{10}$, $R_{11}$, $R_{12}$, and $R_{13}$ each denote an alkyl group, an alkenyl group, or an alkoxy group.

13. The liquid crystal display of claim 12, wherein $R_1$, $R_2$, $R_3$, $R_4$, $R_5$, $R_6$, $R_7$, $R_8$, $R_9$, $R_{10}$, $R_{11}$, $R_{12}$, and $R_{13}$ each have 7 carbons or less.

14. The liquid crystal display of claim 12, wherein the first compound is present at a weight ratio of 13 wt % with respect to the liquid crystal composition, the second compound is present at a weight ratio of 43 wt % with respect to the liquid crystal composition, the third compound is present at a weight ratio of 8 wt % with respect to the liquid crystal composition, the sixth compound is present at a weight ratio of 15 wt % with respect to the liquid crystal composition, the seventh compound is present at a weight ratio of 14 wt % with respect to the liquid crystal composition, the eighth compound is present at a weight ratio of 5 wt % with respect to the liquid crystal composition, and the ninth compound is present at a weight ratio of 2 wt % with respect to the liquid crystal composition.

15. The liquid crystal display of claim 10, wherein a data voltage is applied to the first electrode, a common voltage is applied to the second electrode, and a maximum voltage difference between the data voltage and the common voltage is in the range of 4 V to 4.5 V.

16. The liquid crystal display of claim 15, wherein a distance between the first electrode and the second electrode is 3.4 μm to about 4 μm.

17. The liquid crystal display of claim 16, wherein the liquid crystal composition has rotational viscosity in the range of 61 mPa·s to 65 mPa·s.

18. The liquid crystal display of claim 17, wherein the liquid crystal composition has dielectric anisotropy of 7 to 9 and refractive-index anisotropy of 0.1 to 0.12.

\* \* \* \* \*